Nov. 10, 1931.  G. W. WATTS  1,830,863
REFRIGERATION OIL SEPARATION
Filed Sept. 25, 1930
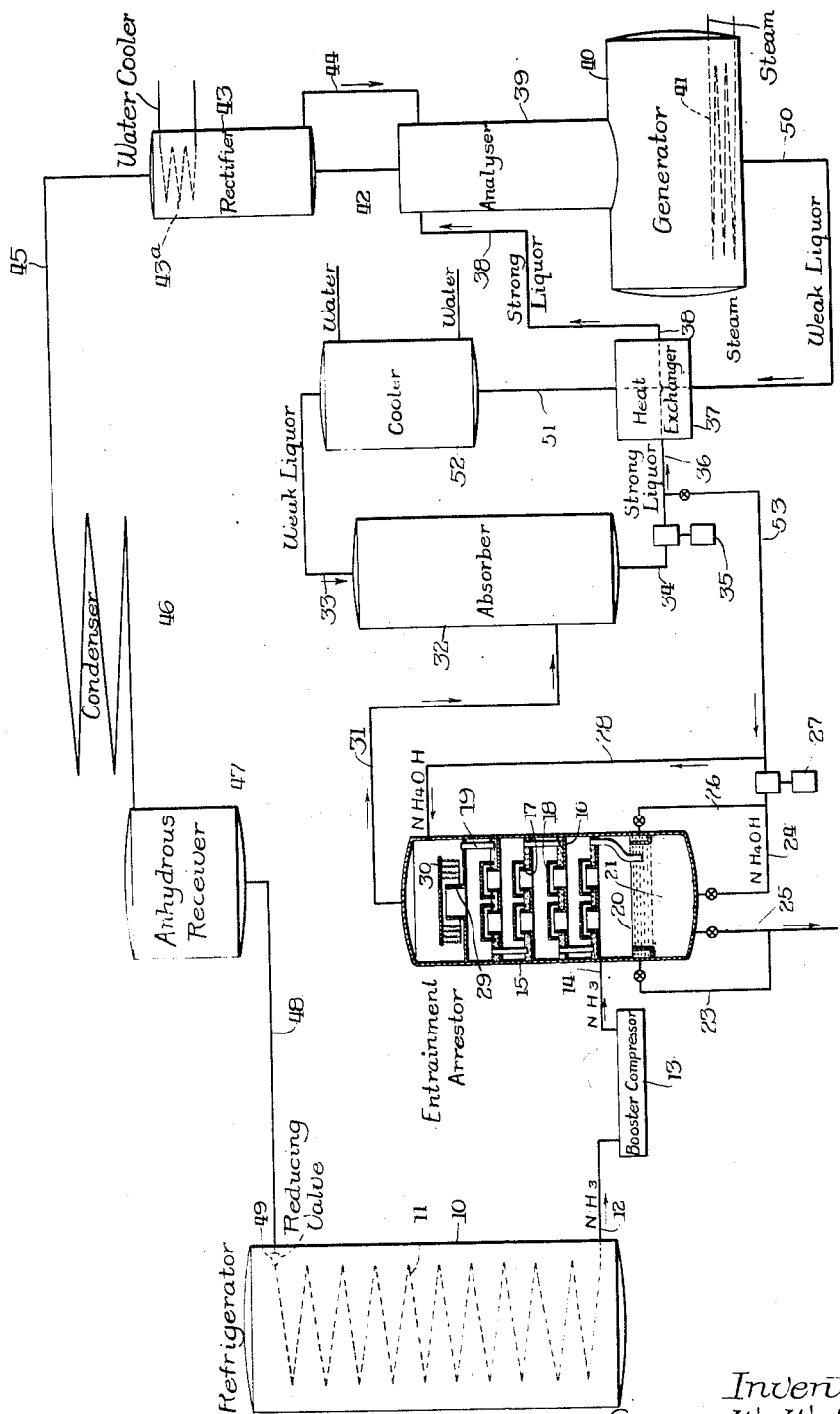
Inventor:
George W. Watts
By Bruce K. Brown atty Patented Nov. 10, 1931

1,830,863

UNITED STATES PATENT OFFICE

GEORGE W. WATTS, OF WHITING, INDIANA, ASSIGNOR TO STANDARD OIL COMPANY (INDIANA), OF CHICAGO, ILLINOIS, A CORPORATION OF INDIANA

REFRIGERATION OIL SEPARATION

Application filed September 25, 1930. Serial No. 484,322.

This invention relates to a refrigeration system and it pertains more particularly to an improved method and means for separating oil from refrigeration gases.

In obtaining unusually low temperatures by means of an absorption refrigeration unit it is necessary to use compressors for boosting gas from expansion pressure to a suitable absorber pressure. When this is necessary, and particularly when a reciprocating compressor is required, oil is introduced into the system. The object of this invention is to provide a system of this type with an efficient oil eliminator or entrainment arrester.

A further object is to provide an improved type of entrainment arrester which is simple and positive in action, and which is particularly adapted for use in a refrigeration system. Other objects will be apparent as the detailed description of my invention proceeds.

The invention contemplates a refrigeration system of the absorption type in which a booster compressor is used to increase the pressure of gases entering the absorber. I contemplate the removal of entrained oil from these gases by circulating a liquid in contact with the compressed gas in a tower, the oil being separated from the liquid in the base of the tower. The particular structure of this tower and its peculiar relation to the other elements of the system will be hereinafter described.

The accompanying drawing is an elevation of my improved refrigeration system and oil separator, parts of the apparatus being shown in section and parts being indicated diagrammatically.

The insulated refrigerator or brine chamber 10 encloses the expansion coil 11, from which ammonia gases are conducted by pipe 12 to booster compressor 13, which is preferably of the reciprocating type. The gas leaving the booster compressor in pipe 14 may contain entrained oil, and unless this oil is removed it will foul the cooling coils, cause trouble in the generator, etc.

To remove the entrained oil I provide a tower 15 with a plurality of plates 16, having up-turned annular flanges 17, over which are placed bubble caps 18. Liquid is maintained on the plates at the desired level and is transferred from the upper plates to the next succeeding lower plates by means of pipes 19. The oil particles are deposited in the liquid on plates 16, as the gases bubble through this liquid in their upward course from plate to plate in the tower.

The liquid, together with the separated oil particles, flows through staggered pipes 19 from plate to plate and thence to the bottom of the tower where they separate into an oil layer 20 and aqueous layer 21 or vice versa, depending upon whether or not the specific gravity of the oil is greater than that of the aqueous liquid. If the oil is the lighter of the two, it may be discharged from the tank through valved pipe 23 and the heavier liquid may be discharged through valved pipe 24; if the oil is the heavier of the two, it is withdrawn from the base of the tower through valved pipe 25 and the aqueous liquid through valved pipe 26. The level of the oil and/or aqueous liquid may be regulated by proper control of the valves in pipes 23 and 24 or pipes 25 and 26.

The liquid which is used to remove the entrained oil from the gases is preferably concentrated ammonia liquor, although non-volatile oil or the like may be used. In my preferred embodiment this liquor is circulated from the bottom of tower 15 to the top thereof by means of circulating or reflux pump 27 and pipe 28. The top plate of the tower is preferably provided with a central chimney 29 covered by a baffle 30 and surrounded by a series of screens of iron wire, steel wool or the like for removing any fine liquid particles introduced into the gas by the bubbling action. The oil-free gases from tower 15 are introduced by pipe 31 into the base of absorber 32 which is equipped with suitable baffles or equivalent means for obtaining intimate contact between said gases and an absorbing fluid, preferably weak liquor, which is introduced at the top of the absorber by pipe 33. The weak liquor is thus converted into strong liquor which is withdrawn from the base of the absorber through pipe 34 and is forced by strong liquor pump 35 through pipe 36, heat exchanger 37 and pipe 38 to analyzer 39. The analyzer is provided with suitable baffles, bubble plates, etc. (not shown) and it is preferably mounted directly over a generator 40 which is heated by steam coils 41.

The heat from steam coil 41 drives off ammonia gas and water vapors which enter the analyzer 39 where they interact with strong liquor from absorber 32 and rectifier 43 to increase the concentration of ammonia in the vapors going to rectifier 43, and to decrease the concentration of ammonia in the liquor returning to the generator 40. The rectifier is equipped with a cooling coil 43A and the purpose of the rectifier is to remove any water (weak liquor or strong liquor) which may be carried into the rectifier by gases leaving the analyzer. The liquor so removed is returned to the analyzer by pipe 44 and the anhydrous ammonia gas is conducted by pipe 45 to condenser 46 wherein it is liquefied. After liquefaction it is conducted to anhydrous receiver 47 and it is then supplied by pipe 48 to reducing valve 49 and expansion coils 11 hereinabove described.

The weak liquor from the base of generator 40 is conducted by pipe 50 through heat exchanger 37, pipe 51, cooler 52 and pipe 33 to absorber 32. Gases passing through entrainment arrester 15 will pick up some moisture and carry it over through pipe 31 into absorber 32. In order to replace this liquid in the circulating entrainment arrester system I provide a valved pipe 53 at the high pressure side of strong liquor pump 35 so that strong liquor may be bypassed into pipe 28 for replacing the liquor lost by evaporation.

I have described the operation of my invention simultaneously with my description of the apparatus. From this description it will be seen that I have provided a novel and effective means for removing entrained oil from gases, and particularly for removing oil from the gases of an absorption refrigeration unit. The novel co-operation of the entrainment arrester with the strong liquor circulation system adds to the effectiveness of this entrainment arrester, and the arrester in turn adds to the efficiency of the refrigeration system.

While I have described a preferred embodiment of my invention in detail, it is understood that I am not limited to said details. For example, I may use any suitable refrigerant instead of ammonia; I may use any suitable gas-liquid contact apparatus in tower 15, and I may modify the system in general in accordance with engineering practice.

I claim:

1. In a refrigeration system an absorber, an expansion coil, an entrainment arrester between said absorber and said expansion coil, means for passing refrigerant gases from said expansion coil through said arrester and into said absorber, means for passing liquor from said absorber to said entrainment arrester, and means for contacting said liquor with said gases therein.

2. An entrainment arrester comprising a tower, means for obtaining intimate contact between a gas and liquid in said tower, means for circulating a liquid through said tower, means for circulating a gas carrying entrained oil in said tower, and means for separating and separately removing said liquid from the oil separated from said gases.

3. An entrainment arrester comprising a bubble tower, means for circulating an aqueous solution through said tower, means for removing entrained particles from gases leaving the tower, means for removing oil from the aqueous solution leaving the tower, and means for separately removing said oil.

4. In combination, an expansion oil, a booster compressor, an entrainment arrester, an absorber, a generator, an analyzer, a condenser and a reducing valve, means for circulating a refrigerant through said elements in the order named, means for circulating an absorbent through said analyzer, generator and absorber countercurrent to said refrigerant, and means for circulating a liquid from the base of said entrainment arrester to the top thereof.

Signed this 28th day of Aug., 1930, at Whiting, in the county of Lake, State of Indiana.

GEORGE W. WATTS.